United States Patent [19]

Shrode

[11] Patent Number: 4,884,588
[45] Date of Patent: Dec. 5, 1989

[54] VEHICLE HOOD SUPPORTED FRAMELESS FOLDABLE PROTECTIVE EMERGENCY SHELTER

[76] Inventor: John Shrode, 3006 Stabler, Lansing, Mich. 48910

[21] Appl. No.: 248,584

[22] Filed: Sep. 26, 1988

[51] Int. Cl.⁴ .............................................. E04H 15/06
[52] U.S. Cl. ........................................ 135/88; 135/900
[58] Field of Search ...................................... 135/88, 900

[56] References Cited

U.S. PATENT DOCUMENTS

| | | | |
|---|---|---|---|
| 1,018,798 | 2/1912 | Whipple et al. | |
| 1,719,055 | 7/1929 | Herzer | 135/88 |
| 2,113,294 | 4/1938 | Dotten | 108/3 |
| 2,246,813 | 6/1941 | Preston | 135/88 |
| 2,366,600 | 1/1945 | Daniel | 135/88 |
| 2,798,501 | 7/1957 | Oliver | 135/4 |
| 2,815,762 | 12/1957 | Smith | 135/5 |
| 3,463,174 | 8/1969 | Heller | 135/1 |
| 3,746,386 | 7/1973 | Woodward | 135/88 |
| 3,863,977 | 2/1975 | Hardinge | 296/23 |
| 3,870,061 | 3/1975 | Lowery | 135/5 |
| 3,894,765 | 7/1975 | Bourke | 135/88 |
| 4,496,184 | 1/1985 | Byrd | 135/88 |
| 4,519,409 | 5/1985 | Kinney | 135/88 |

Primary Examiner—Henry E. Raduazo
Attorney, Agent, or Firm—Miller, Morris & Pappas

[57] ABSTRACT

A frameless foldable protective shelter is provided which can be selectively drapeably deployed over a raised engine hood so as to provide protection from inclement weather for a person working in and around the engine compartment of a vehicle. The emergency protective shelter is comprised of a front panel portion having a securable vertical opening therein, a top portion adapted for drapeable coextensive engagement over a raised engine hood and spaced apart side portions which cooperate with the front panel portion and the top portion to form a ground engaging shelter over the engine compartment area. Weighted elements are provided along the ground engaging edges of the side portions and the front panel portion so as to maintain them in ground engaging contact. Vehicle body engaging magnets are provided along the vertical rear edges of the side portions so as to maintain them in body engaging contact with body of the vehicle upon which they are mounted.

1 Claim, 1 Drawing Sheet

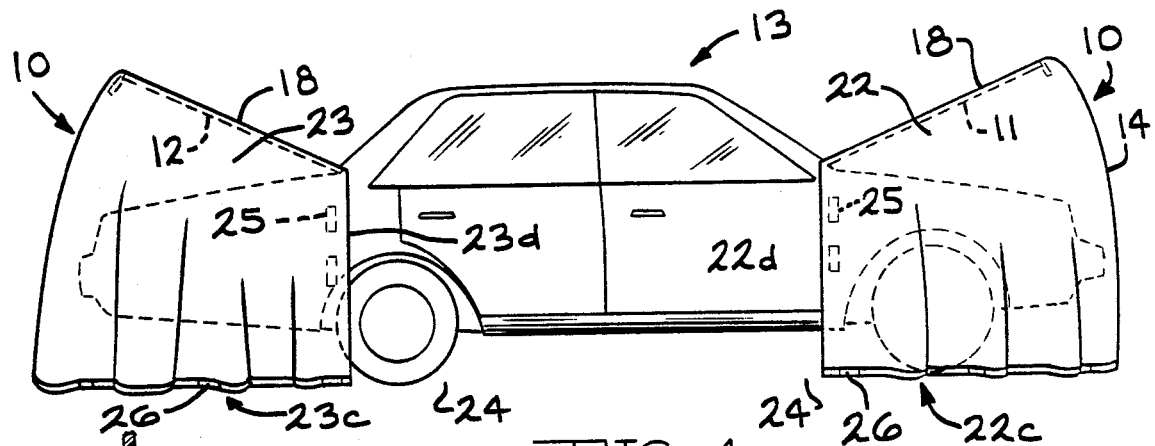
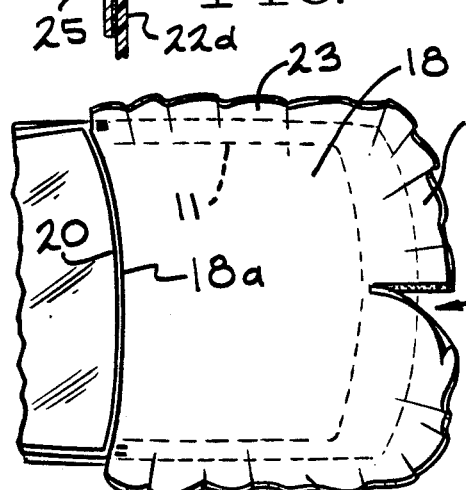
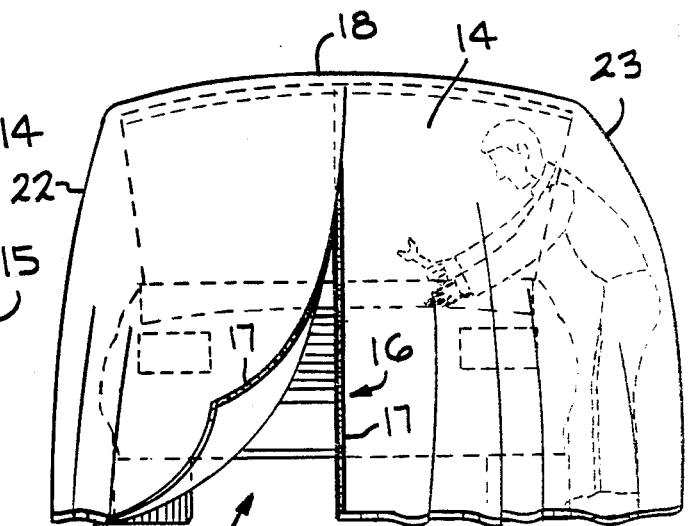
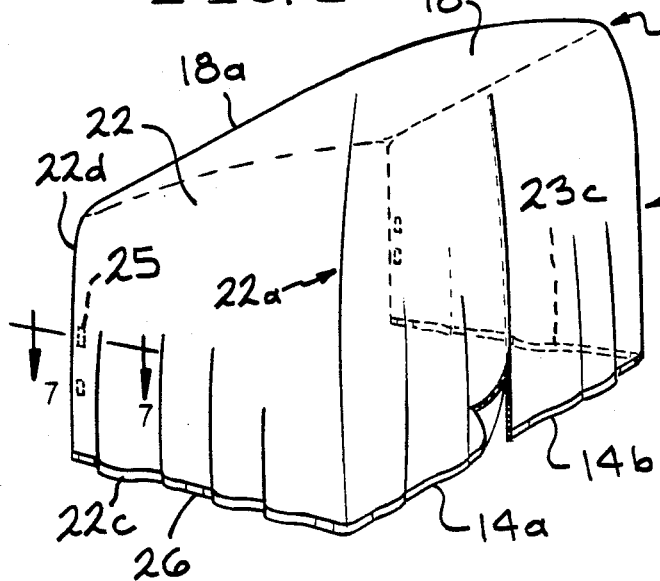
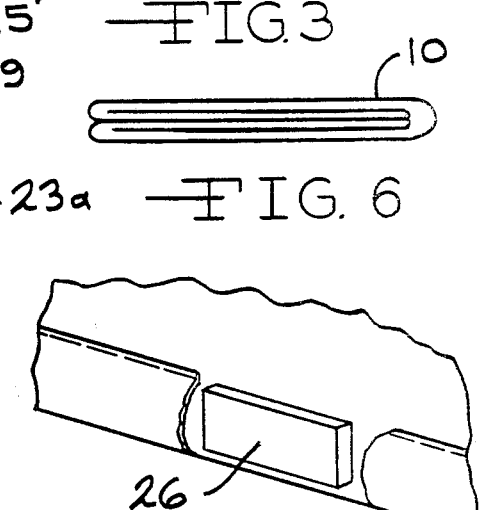

VEHICLE HOOD SUPPORTED FRAMELESS FOLDABLE PROTECTIVE EMERGENCY SHELTER

This invention relates to a frameless foldable protective tent-like emergency shelter which can be selectively drapeably deployed so as to be supported by the raised engine hood of a vehicle to form a protective emergency shelter for a person working over the engine compartment of a disabled vehicle during inclement weather.

More specifically, the invention relates to a foldable protective tent-like shelter which does not utilize an ancillary support frame in association therewith and which is configured so as to be selectively drapeable over raised engine compartment hood and/or as raised trunk lid so as to provide a tent-like emergency shelter for a person working in or around a vehicle-engine compartment or trunk area, respectively, during inclement weather. The ground-engaging edges of the draped protective cover shelter are provided with a plurality of longitudinally aligned spaced-apart weights which serve to freely retain the ground-engaging edges in relativly secure contact with the ground while permitting the worker to freely move around within the area covered by the draped cover shelter. The rear vertical edges of the draped protective tent-like shelter which are located proximate to the passenger compartment of the vehicle are provided with longitudinally vertically aligned magnetic elements which retain the rear vertical edge portions in retentive engagement against the fenders of the vehicle so to maintain the protective integrity of the shelter against the elements. The front wall portion of the draped tent-like protective shelter is provided with a vertical slit portion which defines an opening. The opening is selectively provided with Velcro-type or snap closure means along the vertical edges thereof to permit selective closure of the vertical opening while the shelter is in its operative use position on the vehicle.

Nowhere in the prior known art is there shown a foldable protective tent-like emergency shelter which does not utilize an ancillary support frame and/or vehicle body engaging clamp or anchor means in association therewith and which selectively can be drapeably deployed over a raised engine hood so as to provide a tent-like emergency shelter for a person working in and around the engine compartment of a disabled vehicle during inclement weather.

A need has therefore existed for an inexpensive, foldable emergency shelter which does not use an ancillary support frame and which can be easily stored within a vehicle trunk for use during emergencies.

It is therefore an object of this invention to provide a foldable protective emergency tent-like emergency shelter which does not utilize an ancillary support frame structure or body clamp means in association therewith and which can be easily drapeably deployed over a raised engine hood so as to provide a tent-like emergency shelter for a person working in and around the engine compartment of a disabled vehicle during an emergency.

Other objects and advantage found in the construction of the invention will be apparent from a consideration of the hereinafter appended claims and accompanying drawings.

IN THE DRAWINGS

FIG. 1 is a schematic side elevation view of a vehicle showing the foldable tent-like protective emergency shelter drapeably deployed over a raised engine hood and/or a raised trunk lid.

FIG. 2 is a partial schematic top view showing the tent-like protective emergency shelter drapeably deployed over the raised hood of a disabled vehicle.

FIG. 3 is a schematic front view showing the tent-like protective emergency shelter drapeably deployed over the raised hood of a disabled vehicle with a worker shown in phantom-line working thereunder.

FIG. 4 is a schematic perspective view of a drapeably deployed tent-like protective emergency shelter with the disabled vehicle not shown for purpose of clarity.

FIG. 5 is a partial schematic view of the ground engaging edge portion of the emergency shelter showing one of the weighted element provided therealong.

FIG. 6 is a schematic side view showing the frameless emergency shelter in its fold storage configuration.

FIG. 7 is a schematic sectional view taken on line 7—7 of FIG. 4 showing one of the fender engaging magnetic elements provided along the rear vertical edges of the emergency shelter.

DESCRIPTION

As shown in FIG. 1, the protective emergency shelter 10 can be selectively drapaeably deployed over the raised engine hood 11 and/or over the raised trunk lid 12 of a vehicle 13. The preferred embodiment of the shelter 10 is formed from a semiopaque unitary plastic sheet material and is not free standing in and of itself. It is within the scope of the invention to utilize any type of plastic or rubberized sheet material, canvas and the like that are easily foldable for storage purposes as shown in FIG. 6. The emergency shelter 10 can be folded for storage in the vehicle trunk so as to be available for emergencies. The protective emergency shelter does not contemplate the use of a support frame integral therewith and further does not utilize any undesirable clamp or bolt means to positively secure the shetler to the vehicle body.

As shown generally in the drawings and more specifically in the schematic perspective views of FIGS. 3 and 4, the protective emergency shelter 10 comprises a front panel portion 14 which is provided with a vertical slit opening 15 which can be selectively parted to permit access to the interior of the shelter 10. The vertical edges 16 of the opening 5 are provided with Velcro-type fastener strips 17. A central engine hood-engaging top support portion 18 is provided which is adapted to selectively drapeably coextensively engage the upper surface of the raised engine hood 11 or the raised trunk lid 12 in coextensive register therewith. The top portion 18 is configured to merge with the upper horizontal edge 19 of the front panel 14 and to slope downwardly toward the rear of the hood 12 so that the rear edge 18a thereof rests against the lower horizontal edge 20 of the windshield 21. The emergency shelter 10 is completed by the spaced apart substantially trapezoidably shaped side portions 22 and 23 which have forward edge portions 22a and 23a, respectively, that merge with the front panel 14. The side portions 22 and 23 merge with the top portion 18 along the rearwardly and downwardly sloping top edge portions 22b and 23b.

The horizontal bottom edges 22c and 23c of the side portions 22 and 23 respectively, are configured to freely engage the ground surface 24 when the emergency shelter 10 is in its in situ use position on the raised engine hood 11. The front portion 14 is also provided with lower ground-engaging edges 14a and 14 which are in integral longitudinal alignment with the bottom side edges 22c and 23c respectively.

The rear vertical edges 22d and 23d of the side portions 22 and 23, respectively, are adapted to rest against the sides of the vehicle 13. Magnetic elements 25 are provided along the vertical edges 22d and 23d so as to magnetically secure the edges 22d and 23d to the body of the vehicle. The magnetic elements 25 are glued or otherwise secured in their use position on the emergency shelter 10 as shown in the sectional view of FIG. 7 taken on lines 7—7 of FIG. 4. The bottom edges 22c, 23c, 14a and 14b are provided with weights 26 therealong so as to maintain them in relatively secure ground engaging contact. The weights 2 are secured to the shelter 10 as shown in the partial schematic view of FIG. 5.

In summary, an emergency shelter 14 which can be easily drapeably mounted over a raised engine hood 12 so as to provide a relatively secure protective work area for a worker as shown in FIG. 3.

In summary, a unitary frameless foldable protective emergency shelter is provided for selective drapeable deployment over a raised engine hood during an emergency so as to protect the engine compartment work area and person working therearound from inclement weather. The emergency shelter is comprised of a front panel portion. The front panel portion is provided with a vertical slit opening. The slit opening is provided with closure means to effect selective closure of the opening. An engine hood-engaging rearwardly and downwardly sloped top portion is provided having a rear horizontal edge coextensive with the rear edge of the raised engine hood. The top portion is adapted for coextensive draped engagement with the upper surface of a raised engine hood. A pair of spaced-apart side portions are provided having vertical rear edges. The pair of spaced apart side portions cooperate with the front panel portion and the top portion to form a tent-like protective shelter over the engine compartment of the vehicle. The side portions and the front panel portion have ground engaging bottom edges extending into contact with the ground surface. A plurality of weighted elements are provided along the ground engaging bottom edges of the side portions and the front panel portion so as to maintain the ground engaging bottom edges in relatively secure contact with the ground surface. A plurality of vehicle body engaging magnetic elements are provided along the vertical rear edges so as to maintain the vertical rear edges in vehicle body engaging contact.

Various other modifications of the invention may be made without departing from the principle thereof. Each of the modifications is to be considered as included in the hereinafter appended claims, unless these claims by their language expressly provide otherwise.

I claim:

1. In a unitary frameless foldable protective emergency shelter for selective drapeable deployment over a raised engine hood during an emergency so as to protect the engine compartment work area and person working therearound from inclement weather, the combination comprising:
   a front panel portion, said front panel portion provided with a vertical slit opening, said slit opening provided with closure means to effect selective closure of said opening;
   an engine hood-engaging rearwardly and downwardly sloped top portion having a rear horizontal edge coextensive with the rear edge of the raised engine hood, said top portion adapted for coextensive draped engagement with the upper surface of a raised engine hood;
   a pair of spaced-apart side portions having vertical rear edges, said pair of spaced apart side portions cooperating with said front panel portion and said top portion to form a tent-like protective shelter over the engine compartment of the vehicle, said side portions and said front panel portion having ground engaging edges extending into contact with the ground surface;
   a plurality of weighted elements provided along said ground engaging edges of said side portions and said front panel portion so as to maintain said ground engaging edges in relatively secure contact with the ground surface; and
   a plurality of vehicle body engaging magnetic elements provided along said vertical rear edges so as to maintain said vertical rear edge in vehicle body engaging contact.

* * * * *